April 17, 1962  K. C. FISCHER  3,029,472
PREFORM INJECTION FOAM MOLDER
Filed Nov. 18, 1959  2 Sheets-Sheet 2

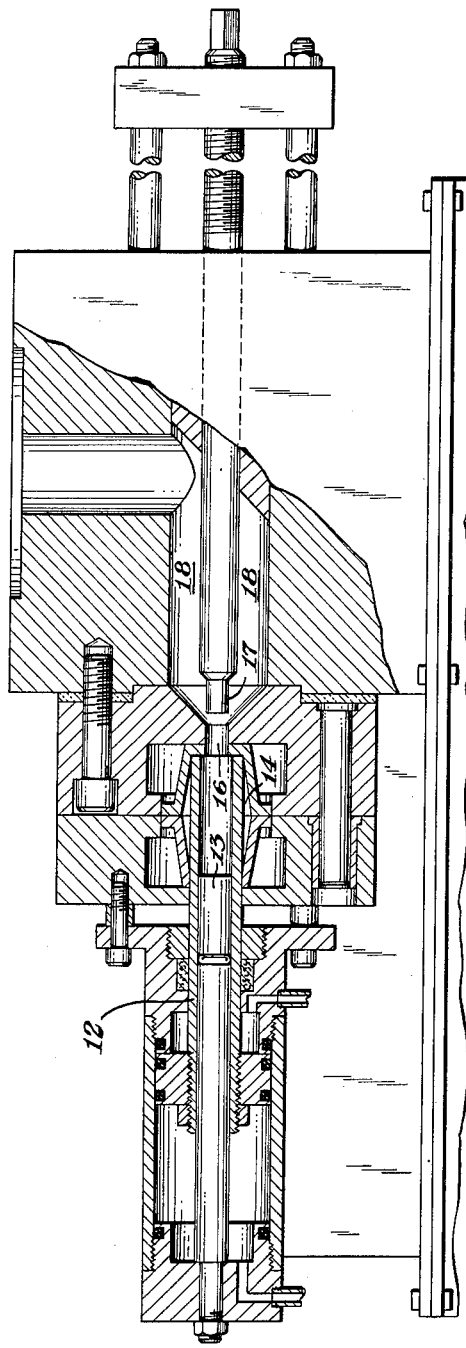
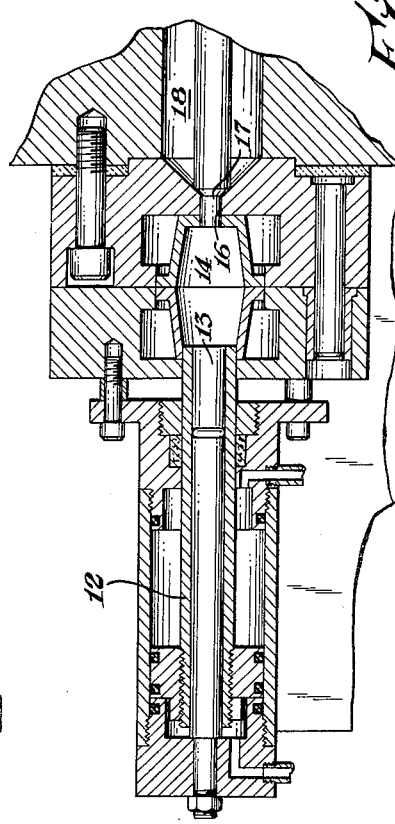
INVENTOR.
Kenneth C. Fischer
BY
Merlin B. Davey
AGENT

INVENTOR.
Kenneth C. Fischer
BY
AGENT

United States Patent Office 3,029,472
Patented Apr. 17, 1962

3,029,472
PREFORM INJECTION FOAM MOLDER
Kenneth C. Fischer, Midland, Mich., assignor to The Dow Chemical Company, Midland, Mich., a corporation of Delaware
Filed Nov. 13, 1959, Ser. No. 853,777
1 Claim. (Cl. 18—30)

This invention relates to a method and apparatus for molding thermoplastic products and is more particularly concerned with a preform-injection foam molder for producing foamed plastic products with uniform density and cell distribution, and with a method of using the apparatus of this invention.

In conventional injection molding practice the foamable polymeric gel is injected under pressure into a mold cavity. As soon as the gel enters the mold cavity it begins to foam due to the decrease in pressure. This makes it very difficult to obtain an even distribution of foam product throughout the cavity, and results in a varying density gradient throughout the molding. I have now invented an apparatus whereby injection moldings of a predetermined and uniform density gradient may be obtained.

In accordance with this invention foamed plastic products having uniform density and cell distribution are produced by injecting a thermoplastic foamable polymeric gel into a retractable preform mold or sleeve, in the form of a right cylinder, within a main mold cavity. The prefoam mold or sleeve is then retracted to a position wherein the innermost edge of the preform sleeve forms a portion of the inner wall of the main mold cavity allowing the preformed polymer to expand and fill the main cavity. To insure complete expansion of the final product, a vacuum may be drawn on the main mold cavity after the preform sleeve has been retracted. The molding may be cooled by circulating water or other coolant around the mold cavity inserts.

The invention will be illustrated with reference to the accompanying drawing, wherein:

FIG. 1 is a diagrammatic sketch in cross section showing the preform sleeve in loading position within a main mold cavity and in combination with loading means for supplying material to the mold.

FIG. 2 is a similar section showing the preform sleeve in the retracted position.

Figure 3:
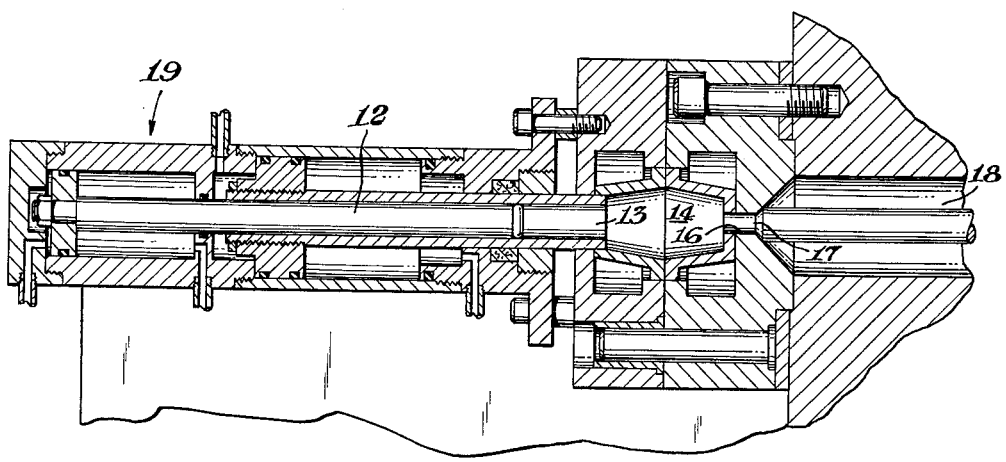
FIG. 3 is a diagrammatic sketch in cross section showing one embodiment wherein the core of the preform sleeve is movable independently of said sleeve.

Referring now to FIG. 1, the numeral 11 indicates the block, 12 indicates the retractable preform sleeve, 13 indicates the core of the preform sleeve which is movable within the sleeve, 14 indicates the main mold cavity, the loading means comprise a loading port 16, valve 17 in the open position and passageway 18 through which the supply of thermoplastic, polymeric gel is fed into the preform sleeve 12. Using the particular apparatus as shown, the molding cycle is started by opening valve 17 thereby allowing the polymeric gel to move through passageway 18, through loading port 16 and into preform sleeve 12. The valve 17 is then closed and the preform sleeve retracted to the position shown in FIG. 2, allowing the preformed material to expand and fill the main mold cavity. If desired, a vacuum may be drawn on the main mold cavity to complete the expansion. The foamed article is then cooled, as by circulating water around the mold cavity inserts, the mold opened and the article removed after which the cycle is repeated.

In an alternative method the core 13 of the sleeve 12 may be advanced into the main mold cavity 14 with the sleeve, and gradually withdrawn as the foamable gel is introduced into the preform sleeve 12 through the passageway 18 and loading port 16 under pressure. One means of accomplishing this is shown in FIG. 3 wherein the number 19 indicates a mechanism for obtaining movement of core 12 independently of preform sleeve 13. When completely withdrawn the inner ends of the core 13 and preform sleeve 12 form a portion of the inner wall of the main mold cavity.

As a specific illustration, a main mold in the form of two hollow frusto-conical sections of identical size having inner diameters of 1.75 inches for one base and 1.25 inches for the smaller base and of 1.75 inches in height was constructed. The small base of one of the sections had a circular opening 1.25 inches in diameter centrally located therein, adapted to contain the hollow cylindrical sleeve 12 of approximately the same diameter as shown in FIG. 1. The other base had a circular opening ½ inch in diameter centrally located therein and adapted to sealably engage the loading port 16 as shown in FIG. 1. A core 13 was positioned within the cylindrical sleeve 12 and was adapted to move longitudinally independently of said sleeve. Using this apparatus it was found that a pressure of 350 p.s.i. at 300° F. was sufficient to inject foamable polystyrene gels through passageway 18 and loading port 16 into the preform sleeve 12 without prefoaming. Foamed samples were produced having densities of from 5 to 25 pounds per cubic foot. When these moldings were sliced in different sections visual examination disclosed a constant density gradient.

It is readily apparent that other configurations such as triangular, square, or polygonal sleeves and the like may be used and it is understood that the present invention is limited only by the appended claim.

I claim:

A preform-injection foam molder for molding thermoplastic materials comprising in combination a preform sleeve retractably positioned within a main mold cavity and adapted to be filled with the moldable material and an independently movable core positioned within and in slidable contact with all surfaces of said preform sleeve adapted to enter said main mold cavity with said preform sleeve, be withdrawn from said main mold cavity as said preform sleeve is filled with a foamable gel and eject the preformed product from the preform sleeve when said preform sleeve is withdrawn from said main mold cavity, said core and sleeve forming a portion of the wall of said main mold cavity when fully retracted.

References Cited in the file of this patent

UNITED STATES PATENTS

| | | |
|---|---|---|
| 1,939,831 | Scheible | Dec. 19, 1933 |
| 2,354,260 | Haney | July 25, 1944 |
| 2,398,318 | MacMillen | Apr. 9, 1946 |
| 2,469,130 | Rodman | May 3, 1949 |
| 2,530,289 | Cook | Nov. 14, 1950 |
| 2,781,547 | Moxness | Feb. 19, 1957 |
| 2,789,313 | Knowles | Apr. 23, 1957 |